(12) United States Patent
Kolouri et al.

(10) Patent No.: US 10,691,972 B2
(45) Date of Patent: Jun. 23, 2020

(54) MACHINE-VISION SYSTEM FOR DISCRIMINANT LOCALIZATION OF OBJECTS

(71) Applicant: HRL Laboratories, LLC, Malibu, CA (US)

(72) Inventors: Soheil Kolouri, Calabasas, CA (US); Charles E. Martin, Thousand Oaks, CA (US); Heiko Hoffmann, Simi Valley, CA (US)

(73) Assignee: HRL Laboratories, LLC, Malibu, CA (US)

( * ) Notice: Subject to any disclaimer, the term of this patent is extended or adjusted under 35 U.S.C. 154(b) by 76 days.

(21) Appl. No.: 15/958,564

(22) Filed: Apr. 20, 2018

(65) Prior Publication Data

US 2018/0307936 A1 Oct. 25, 2018

Related U.S. Application Data

(60) Provisional application No. 62/487,824, filed on Apr. 20, 2017.

(51) Int. Cl.
| | |
|---|---|
| *G06K 9/46* | (2006.01) |
| *G06K 9/48* | (2006.01) |
| *B25J 9/02* | (2006.01) |
| *G06N 5/04* | (2006.01) |
| *G06N 3/04* | (2006.01) |
| *G06K 9/62* | (2006.01) |
| *G06K 9/32* | (2006.01) |
| *G06N 3/08* | (2006.01) |

(52) U.S. Cl.
CPC ............. *G06K 9/48* (2013.01); *B25J 9/02* (2013.01); *G06K 9/3241* (2013.01); *G06K 9/4628* (2013.01); *G06K 9/627* (2013.01); *G06N 3/0454* (2013.01); *G06N 3/084* (2013.01); *G06N 5/046* (2013.01)

(58) Field of Classification Search
CPC .......... B25J 9/02; G06N 3/0454; G06N 5/046
See application file for complete search history.

(56) References Cited

U.S. PATENT DOCUMENTS 9,542,621 B2   1/2017  He et al.
9,542,626 B2 * 1/2017  Martinson ............ G06K 9/6256
(Continued)

OTHER PUBLICATIONS

Zhou et al, "Learning Deep Features for Discriminative Localization", CVPR, p. 2921-2929 (Year: 2016).*
(Continued)

*Primary Examiner* — Edward Park
(74) *Attorney, Agent, or Firm* — Tope-McKay & Associates

(57) ABSTRACT

Described is a system for discriminant localization of objects. During operation, the system causes one or more processors to perform an operation of identifying an object in an image using a multi-layer network. Features of the object are derived from the activations of two or more layers of the multi-layer network. The image is then classified to contain one or more object classes, and the desired object class is localized. A device can then be controlled based on localization of the object in the image. For example, a robotic arm can be controlled to reach for the object.

12 Claims, 6 Drawing Sheets
(3 of 6 Drawing Sheet(s) Filed in Color)

(56) References Cited

U.S. PATENT DOCUMENTS

| | | | |
|---|---|---|---|
| 2012/0061155 A1* | 3/2012 | Berger | B25J 5/007 180/21 |
| 2016/0140436 A1 | 5/2016 | Yin et al. | |
| 2017/0083792 A1 | 3/2017 | Rodriguez-Serrano et al. | |

OTHER PUBLICATIONS

Notification of Transmittal of International Search Report and the Written Opinion of the International Searching Authority for PCT/US2018/028621; dated Aug. 9, 2018.

International Search Report of the International Searching Authority for PCT/US2018/028621; dated Aug. 9, 2018.

Written Opinion of the International Searching Authority for PCT/US2018/028621; dated Aug. 9, 2018.

Zhou et al., 'Learning Deep Features for Discriminative Localization'. Jun. 27, 2016, pp. 2921-2929.

Simonyan, Karen, and Andrew Zisserman. "Very deep convolutional networks for large-scale image recognition." arXiv preprint arXiv:1409.1556, (2014), pp. 1-14.

Girshick, Ross, et al. "Region-based convolutional networks for accurate object detection and segmentation." IEEE transactions on pattern analysis and machine intelligence 38.1 (2016): pp. 142-158.

Ren, Shaoqing, et al. "Faster R-CNN: Towards real-time object detection with region proposal networks." Advances in neural information processing systems. 2015, pp. 1-9.

Zhou, Bolei, et al. "Learning Deep Features for Discriminative Localization." In Proceedings of the IEEE Conference on Computer Vision and Pattern Recognition, pp. 819-826. 2016.

Vaillant, Régis, Christophe Monrocq, and Yann Le Cun. "Original approach for the localization of objects in images." IEE Proceedings-Vision, Image and Signal Processing 141.4 (1994): pp. 245-250.

Dalal, Navneet, and Bill Triggs. "Histograms of oriented gradients for human detection." In 2005 IEEE Computer Society Conference on Computer Vision and Pattern Recognition (CVPR'05), vol. 1, pp. 886-893.

Notification of International Preliminary Report on Patentability Chapter I for PCT/US2018/028621; dated Oct. 31, 2019.

International Preliminary Report on Patentability Chapter I for PCT/US2018/028621; dated Oct. 31, 2019.

\* cited by examiner

MACHINE-VISION SYSTEM FOR DISCRIMINANT LOCALIZATION OF OBJECTS

CROSS-REFERENCE TO RELATED APPLICATIONS

This application claims the benefit of and is a non-provisional patent application of U.S. Provisional Application No. 62/487,824, filed on Apr. 20, 2017, the entirety of which is hereby incorporated by reference.

BACKGROUND OF INVENTION

(1) Field of Invention

The present invention relates to an object recognition system and, more specifically, to a machine-vision system for discriminant localization of objects.

(2) Description of Related Art

Object localization and detection is a process by which objects are identified within video imagery. Recently, many applications (e.g., military, etc.) require a machine vision system to not only classify, but also localize objects from a camera input image. A variety of techniques have been devised to localize such objects. For example, prior art achieve localization through the region-based convolutional neural network (R-CNN) (see the List of Incorporated Literature References, Literature Reference No. 2) and its faster variations (see Literature Reference No. 3). In short, these methods first extract a large number of image regions (i.e., patches) from an input camera image and classify these patches. Such prior art methods continue by using a bounding-box regression to finally localize the object. Although R-CNNs are shown to be mostly accurate, they are still computationally expensive as they require: 1) large number of region classifications, and 2) bounding box regression.

Classical approaches in object localization often utilize sliding-window detectors, early face-detectors (see Literature Reference No. 5) and pedestrian detectors (see Literature Reference No. 6). More recently and as noted above, several researchers (see Literature Reference Nos. 2 and 3) proposed methods that first compute a pool of potentially overlapping image regions, where each region is potentially an object candidate, and then these regions are classified into object categories and finally a region-regression algorithm is used to localize objects in an image.

Alternatively, Zhou et al. (see Literature Reference No. 4) used global average pooling to model convolutional activation patterns to recognize localized objects. Their approach introduced a new paradigm in discriminant localization of objects as it only required a one-step solution, which is computationally efficient.

However, the localization resolution for their method is low as it only analyzes the last convolutional layer of the network, which does not contain high-resolution spatial information.

Thus, a continuing need exists for a computationally efficient method for achieving spatially accurate localization of objects

SUMMARY OF INVENTION

This disclosure provides is a system for discriminant localization of objects. During operation, the system causes one or more processors to perform an operation of identifying an object in an image using a multi-layer network. Features of the object are derived from the activations of two or more layers of the multi-layer network. The image is then classified to contain one or more object classes, and the desired object class is localized. A device can then be controlled based on localization of the object in the image. For example, a robotic arm can be controlled to reach for the object.

In another aspect, localizing the object in the image further comprises an operation of generating a heatmap that indicates a presence of the object.

In another aspect, the multi-layer network is a convolutional neural network (CNN).

In yet another aspect, the object is classified using general average pooling of features from all layers of the CNN.

Additionally, the object is localized based on a linear combination of up-sampled responses from the CNN.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where.

DETAILED DESCRIPTION

Figure 1:
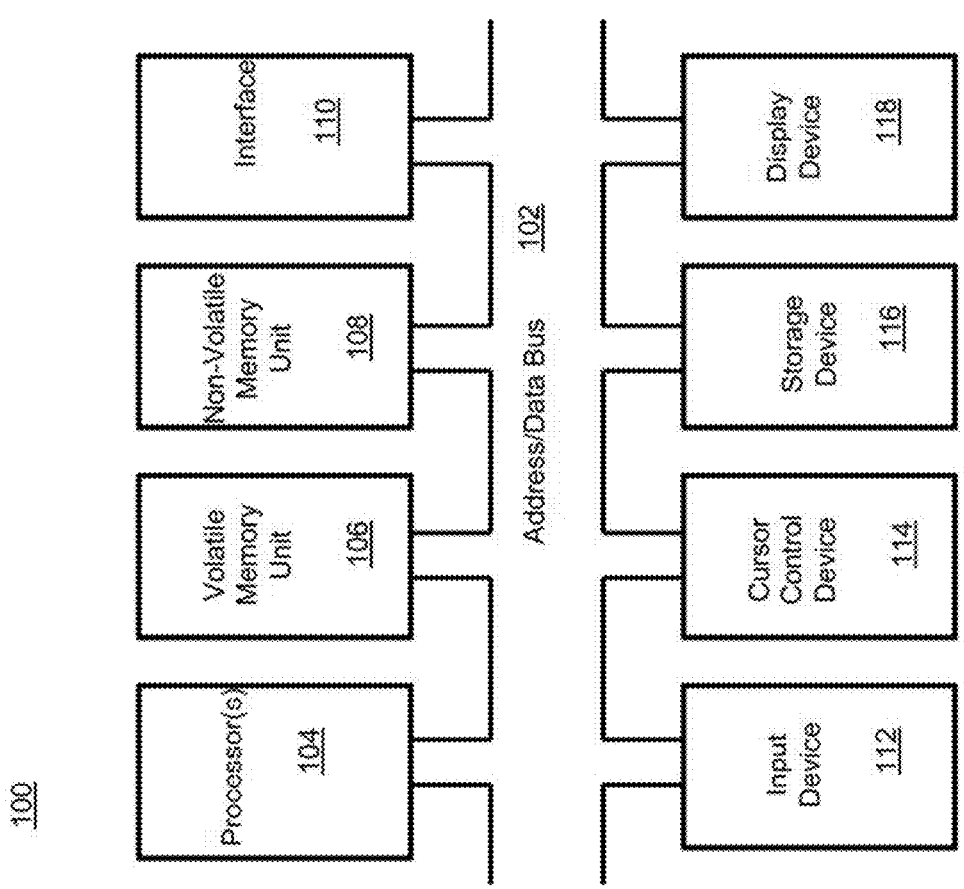
FIG. 1 is a block diagram depicting the components of a system according to various embodiments of the present invention.

The present invention relates to an object recognition system and, more specifically, to a machine-vision system for discriminant localization of objects. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Simonyan, Karen, and Andrew Zisserman. "Very deep convolutional networks for large-scale image recognition." *arXiv preprint* arXiv:1409.1556(2014).
2. Girshick, Ross, et al. "Region-based convolutional networks for accurate object detection and segmentation." *IEEE transactions on pattern analysis and machine intelligence* 38.1 (2016): 142-158.
3. Ren, Shaoqing, et al. "Faster R-CNN: Towards real-time object detection with region proposal networks." *Advances in neural information processing systems.* 2015.
4. Zhou, Bolei, et al. "Learning Deep Features for Discriminative Localization." In *Proceedings of the IEEE Conference on Computer Vision and Pattern Recognition*, pp. 819-826. 2016.
5. Vaillant, Régis, Christophe Monrocq, and Yann Le Cun. "Original approach for the localization of objects in images." *IEE Proceedings—Vision, Image and Signal Processing* 141.4 (1994): 245-250.
6. Dalal, Navneet, and Bill Triggs. "Histograms of oriented gradients for human detection." In 2005 *IEEE Computer Society Conference on Computer Vision and Pattern Recognition (CVPR'05)*, vol. 1, pp. 886-893. IEEE, 2005.

(2) PRINCIPAL ASPECTS

Various embodiments of the invention include three "principal" aspects. The first is a system for discriminant localization of objects. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
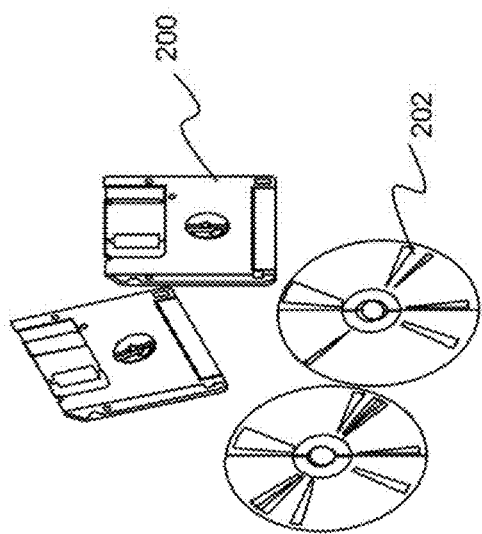
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

This disclosure provides a machine vision system which is capable of discriminating and localizing objects from imagery, such as camera images. Discriminant localization of objects enables a user to understand the decisions of a complex machine vision system given camera input data. The system uses a convolutional neural network (CNN) (such as that described in Literature Reference No. 1) combined with the general average pooling (GAP) (see Literature Reference No. 4 for a discussion of GAP) from all layers of a convolutional neural network to classify and, more importantly, localize objects. An important aspect of the system described herein is that it enables the operator to identify why the network is making a mistake and misclassifying an object in a camera image. Further, the system of this disclosure is computationally efficient and capable of achieving localization in one step and hence is orders of magnitude faster than the prior art.

Fast and trustworthy machine vision systems, which are capable of detecting and localizing objects, are a key requirement for a number of applications. For example, the processing of camera data is considered to be essential in any autonomous driving systems. Moreover, such machine vision systems can be implemented in autonomous drones or camera surveillance, and other systems in which object localization is desired or necessary. Further details are provided below.

(4) SPECIFIC DETAILS OF VARIOUS EMBODIMENTS

Figure 3:
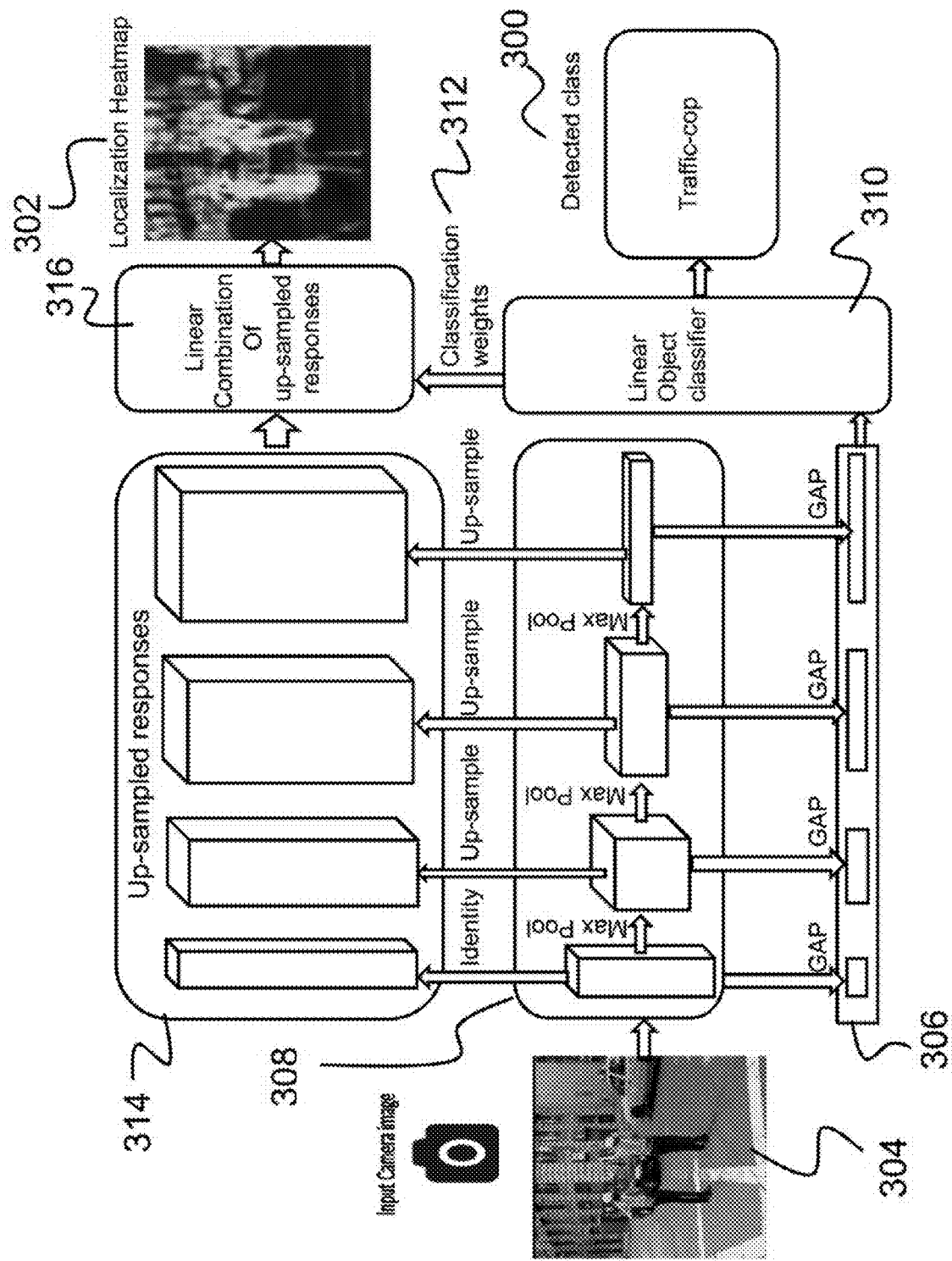
FIG. 3 is a flowchart depicting a process flow according to various embodiments of the present invention.

As shown in the flow chart as depicted in FIG. 3, a key aspect of the system of this disclosure is to recognize (detect via probability in a particular class 300) and localize (e.g., via a localization heatmap 302, etc.) objects in a camera image 304 or other imagery. For example, the camera may be electric optical, infrared (IR), short wave IR, or similar, such that the output is an intensity image 304 with one or more color-like channels. These one or multi-channeled intensity images 304 are then processed to generate probabilities of existence of object classes and localize them in the image 304.

During operation, a convolutional neural network (CNN) 308 performs feature extraction on the image 304 to generate a series of layered, and multiresolution neural responses. The generated neural responses of the CNN 308 are further analyzed in parallel by: 1) general average pooling (GAP) 306, which averages the neural responses in the spatial coordinates and provide a fixed-dimensional representation vector, and 2) the up-sampling operators 314 to up-sample the neural responses (i.e. to counter the Max pooling operators in the CNN 308) to match the size of the input camera image 304, leading to a series of neural responses with the same size as the input camera image 304.

The image 304 is classified to test if an object is present or not. The components 306, 308, and 310 classify the image. The GAP feature representation 306 of the responses from the layers of the CNN 308 is the input to a linear object classifier 310. The output 300 of the linear object classifier 310 is the probability of class membership in a class. If the probability exceeds a predetermined threshold (e.g., greater than 70% likelihood), then the object is designed as being a detected object within a particular class (e.g., traffic-cop, car, dog, etc.). Additionally, classification weights 312 are the parameters of the learned linear classifier 310.

Separately, the components 314 and 316 localize the object class within the image 304. The responses from the layers of the CNN 308 are up-sampled to create a collection of up-sampled responses 314. The up-sampled responses 314 are combined with the classification weights 312 to generate a linear combination of up-sampled responses 316. The up-sampled responses 314 are combined with the classification weights 312 by weighted averaging (i.e., linear combination) with respect to the classification weights 312. The weighted combination of up-sampled responses 314 results in a localization heatmap 302. Further details regarding these processes are provided below. Specifically, provided below is a description of prior art followed by a detailed description of the machine-vision system for discriminant localization according to the present disclosure.

(4.1) Classic CNN and Prior Art

In a classic or traditional CNN, let $\phi_k^d$ be the i'th convolutional response of the CNN at depth d and let the CNN be of depth D. Discarding the fully connected layers of the CNN, and assuming only a logistic classifier is used, the object classification can be done through, $$c = \text{argmax}_i \Sigma_{m,n,k} w_{m,n,k}^i \phi_k^D[m,n],$$

where $w_{m,n,k}^i$ are the classification weights for class i, m and n are the spatial indices of the convolutional responses, and k is the index of the convolutional kernel.

Zhou et al. (see Literature Reference No. 4) proposed the idea of fixing the weights of the classifier to only be a function of k, simplifying above the equation to, $$c = \text{argmax}_i \Sigma_k w_k^i \Sigma_{m,n} \phi_k^D[m,n],$$

which is equivalent of having a general average pooling layer on top of the last layer of the CNN, and applying a logistic classifier on the GAP features.

Zhou et al. then showed that an object localization heatmap $\psi$ can be extracted from such classifier as:

$$\psi = h(\Sigma_k w_k^c \phi_k^D),$$

where h(.) is an up-sampling function, which reverses the effect of max poolings throughout the network. The limitation though is that the last layer lacks spatial resolution: the convolutional responses, $\phi_k^D$, lack detailed spatial information, and, hence, the reconstructed localization map is crude.

The technique of the present disclosure addresses this problem and provides a spatially-resolved localization.

(4.2) Machine-Vision System for Discriminant Localization According to the Present Disclosure The machine-vision system for discriminant localization according to the present disclosure extends the approach presented by Zhou et al. (see Literature Reference No. 4) by utilizing GAP features from all layers of the CNN. More precisely, method defines (and learns) the classifier to be:

$$c^* = \text{argmax}_c \Sigma_{k,d} w_{k,d}^c \underbrace{\frac{1}{m_d n_d} \Sigma_{m_d, n_d} \phi_k^d[m_d, n_d]}_{\text{GAP feature}},$$

where $m_d$ and $n_d$ are the indices of the convolutional responses at layer d. Note that the above equation involves summation over d and hence it utilizes the GAP features from all layers of the CNN.

In this manner, the localization heatmap 302 is generated from $$\psi = \Sigma_d h_d(\Sigma_k w_{k,d}^c \phi_k^d),$$

where $h_d(.)$ is the corresponding upsampling function needed to upsample the convolutional responses at layer d, to the original input image size.

(4.3) Training the CNN

Figure 6:
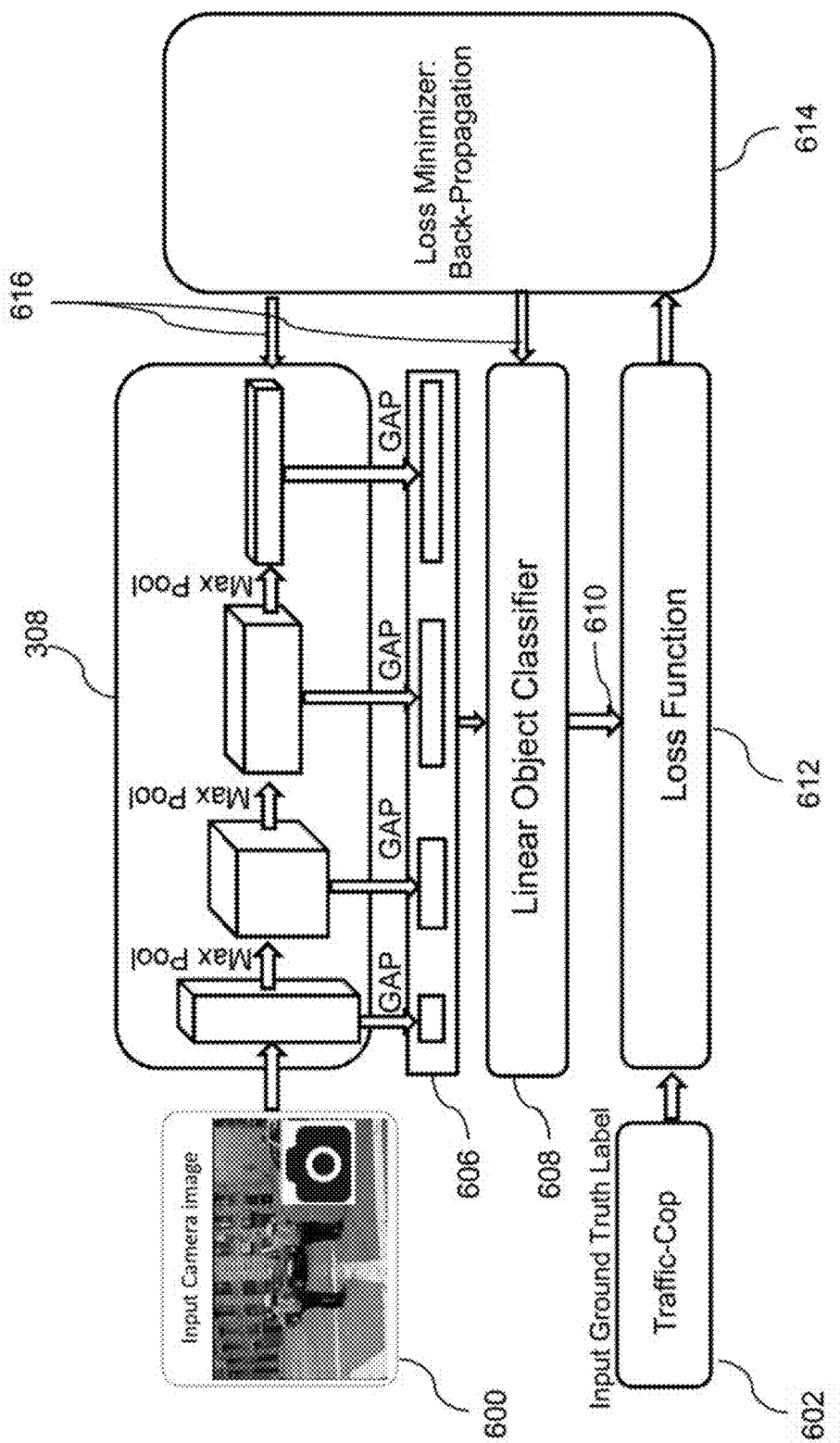
FIG. 6 is a flowchart depicting a training process flow according to various embodiments

In various embodiments, the CNN is desirably trained to further enhance classification or localization. During training and as shown in FIG. 6, the input to the system are the input camera image 600 and the corresponding ground truth label 602 (e.g. "traffic-cop", as provided by an operator or predesignated). The CNN 308 parameters are randomly initialized and the input image 600 is fed forward to the CNN 308 to obtain the layered neural responses. Global average pooling (GAP) is used to obtain a succinct representation of the neural activations 606 of the convolutional layers 308. The GAP features 606 are fed to a randomly initialized linear classifier 608. The predicted label 610 and the ground truth labels 602 are used to define a loss/objective function 612 (Equations are below). The loss function is minimized via back-propagation 614 and the network and classifier weights are updated using the output of the minimizer 616 via a standard gradient-descent scheme.

In the training phase, the goal is to learn the convolutional kernels as well as the classification parameters. For example, let all the convolutional kernels in the network be represented as θ, then for an input image, I, the network responses at all layers, $\phi_k^d$, depend on these convolutional kernels. For simplicity, for an input image, $I_i$, and convolutional kernels, θ, let the GAP feature, shown in the equation above, be represented as $\Phi_{k,d}(I_i|\theta)$. Let $y_i = [y_i^0, \ldots, y_i^C]$ be the corresponding label vector for image $I_i$, where $y_i^c \in \{0,1\}$ represents the existence or absence of class c in the image. The training is then accomplished by minimizing the following objective function, $$\text{argmin}_{\theta, w} \Sigma_i \Sigma_c (\Sigma_{k,d} w_{k,d}^c \Phi_{k,d}(I_i|\theta) - y_i^c)^2.$$

This objective function is then optimized using any suitable optimization technique. As a non-limiting example, the objective function is optimized via stochastic gradient descent (SGD) (see Literature Reference No. 1 for a discussion of SGD).

(4.4) Testing

Figure 4:
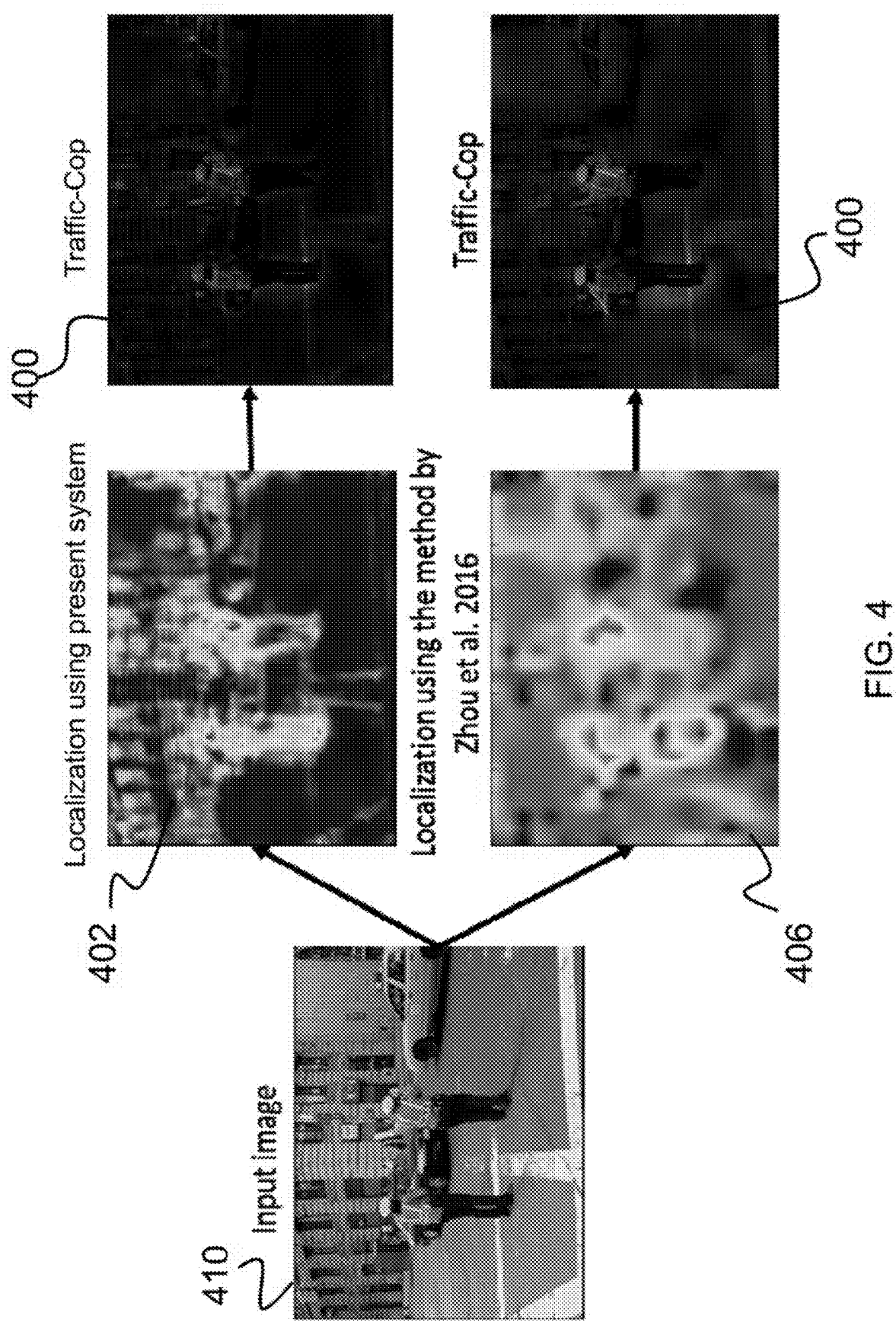
FIG. 4 is an illustration depicting a comparison of test results of the present invention with that of the prior art.

The system of this disclosure was tested to demonstrate the effectiveness of the system. Testing results are illustrated in FIG. 4. In testing, the heat map was computed using the GAP features and weights derived from the above optimization process. FIG. 4 illustrates the discrimination 400 and localization 402 results obtained using the system of the present disclosure and the corresponding results 400 and 406 obtained using the method proposed by Zhou et al. The results were obtained using the same input image 410. It can be seen that the present method provides a better localization for the classified class (e.g., Traffic Cop in this example).

(4.5) Control of a Device.

Figure 5:
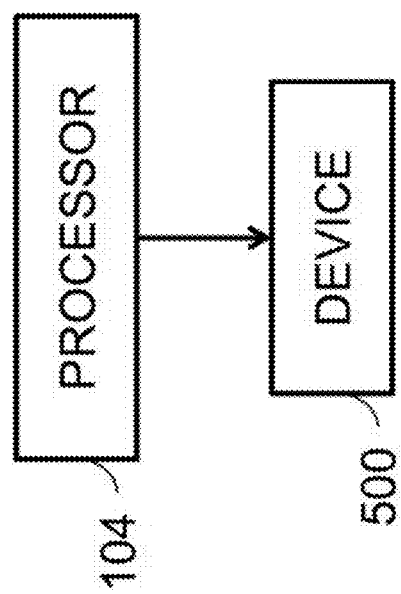
FIG. 5 is a block diagram depicting control of a device according to various embodiments.

As shown in FIG. 5, a processor 104 may be used to control a device 500 (e.g., a mobile device display, a virtual reality display, an augmented reality display, a computer monitor, a motor, a machine, a drone, a camera, etc.) based on discriminating (i.e., classifying) and localizing the object. The control of the device 500 may be used to transform the localization of an object into a still image or video representing the object. In other embodiments, the device 500 may be controlled to cause the device to move or otherwise initiate a physical action based on the discrimination and localization.

In some embodiments, a drone or other autonomous vehicle may be controlled to move to an area where the localization of the object is determined to be based on the imagery. In yet some other embodiments, a camera may be controlled to orient towards the localization. In other words, actuators or motors are activated to cause the camera (or sensor) to move or zoom in on the location where the object is localized. In yet another aspect, if a system is seeking a particular object and if the object is not determined to be within the field-of-view of the camera after the discrimination process, the camera can be caused to rotate or turn to view other areas within a scene until the sought-after object is detected. In yet some other embodiments, a robotic arm may be controlled to reach for the localized object. The localization of the object in one or more images is first converted into image coordinates, for example, through blob detection on the heatmap. Then, the image coordinates in one or more images are geometrically transformed into x, y, z coordinates of the object in the robot-centered coordinate frame. Then, for example, actuators and/or motors on the robotic arm can be activated to cause the robotic arm to grasp or otherwise touch the localized object. It should be understood that although a robot arm is described with respect to the x, y, and z coordinates, the invention is not intended to be limited thereto and can be implemented with any device (including robot arms, vehicles, etc.) that can be caused to move or otherwise perform an operation based on the x, y, and z coordinates of the localized object (such as causing a vehicle (e.g., car, drone, etc.) to maneuver to avoid the object, or drive to the object, etc.).

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for discriminant localization of objects, the system comprising:
    one or more processors and a memory, the memory being a non-transitory computer-readable medium having executable instructions encoded thereon, such that upon execution of the instructions, the one or more processors perform operations of:
        identifying an object in an image using a multi-layer network;
        deriving features of the object from the activations of all layers of the multi-layer network;
        classifying the image to contain one or more object classes using global average pooling (GAP) of features from all layers of the multi-layer network; and
        localizing the object class in the image by generating a heatmap based on GAP features from all layers of the multi-layer network, the heatmap indicating a presence of the object.

2. The system as set forth in claim 1, further comprising an operation of controlling a device based on a localization of the object in the image.

3. The system as set forth in claim 2, wherein controlling the device further comprises causing a robotic arm to reach for the object.

4. The system as set forth in claim 1, wherein the multi-layer network is a convolutional neural network (CNN).

5. A computer program product for discriminant localization of objects, the computer program product comprising:
    a non-transitory computer-readable medium having executable instructions encoded thereon, such that upon execution of the instructions by one or more processors, the one or more processors perform operations of:
        identifying an object in an image using a multi-layer network;
        deriving features of the object from the activations of all layers of the multi-layer network;
        classifying the image to contain one or more object classes using global average pooling (GAP) of features from all layers of the multi-layer network; and
        localizing the object class in the image by generating a heatmap based on GAP features from all layers of the multi-layer network, the heatmap indicating a presence of the object.

6. The computer program product as set forth in claim 5, further comprising an operation of controlling a device based on a localization of the object in the image.

7. The computer program product as set forth in claim 6, wherein controlling the device further comprises causing a robotic arm to reach for the object.

8. The computer program product as set forth in claim 5, wherein the multi-layer network is a convolutional neural network (CNN).

9. A computer implemented method for discriminant localization of objects, the method comprising an act of:
    causing one or more processors to execute instructions encoded on a non-transitory computer-readable medium, such that upon execution, the one or more processors perform operations of:
        identifying an object in an image using a multi-layer network;
        deriving features of the object from the activations of all layers of the multi-layer network;

classifying the image to contain one or more object classes using global average pooling (GAP) of features from all layers of the multi-layer network; and localizing the object class in the image by generating a heatmap based on GAP features from all layers of the multi-layer network, the heatmap indicating a presence of the object.

10. The method as set forth in claim 9, further comprising an operation of controlling a device based on a localization of the object in the image.

11. The method as set forth in claim 10, wherein controlling the device further comprises causing a robotic arm to reach for the object.

12. The method as set forth in claim 9, wherein the multi-layer network is a convolutional neural network (CNN).

* * * * *